United States Patent [19]

Tracy et al.

[11] Patent Number: 4,780,372
[45] Date of Patent: Oct. 25, 1988

[54] SILICON NITRIDE PROTECTIVE COATINGS FOR SILVERED GLASS MIRRORS

[75] Inventors: C. Edwin Tracy; David K. Benson, both of Golden, Colo.

[73] Assignee: The United States of America as represented by the United States Department of Energy, Washington, D.C.

[21] Appl. No.: 873,069

[22] Filed: Jun. 4, 1986

Related U.S. Application Data

[63] Continuation of Ser. No. 632,742, Jul. 20, 1984, abandoned.

[51] Int. Cl.$^4$ ............................................. B32B 17/06
[52] U.S. Cl. ................................. 428/428; 350/641; 350/642; 427/397.7; 427/419.7; 428/433; 428/434; 428/448; 428/450; 428/469; 428/472; 428/472.1; 428/698; 428/912.2
[58] Field of Search .................... 428/428, 912.2, 434, 428/433, 450, 451, 458, 460–463, 698, 912.2, 469, 448, 472, 472.1; 427/94, 419.7, 397.7; 350/641, 642

[56] References Cited

U.S. PATENT DOCUMENTS

| | | | |
|---|---|---|---|
| 4,097,889 | 6/1978 | Kem et al. | 427/94 |
| 4,273,828 | 6/1981 | Tracy et al. | 428/336 |
| 4,517,217 | 5/1985 | Hoffman | 428/428 |

OTHER PUBLICATIONS

Kern & Rosler, *Advances in Deposition Process for Passivation Films*, J. of Vac. Sci & Techno. vol. 14, No. 5, pp. 1082–1099, 1977.

Milek, *Silicon Nitride for Microelectronic Applications*, Handbook of Electronic Materials, vol. 3, IFI/Plenum, NY, NY, pp. 10–13 (1971); SERI/TR-31-042.

*SERI Materials Branch Semiannual Report*, Jan. 1, 1978–Jun. 30, 1978, Solar Energy Research Institute, Golden, Colorado, (1978).

SERI/RR-31-145, *Solar Glass Mirror Program A Planning Report on Near-Term Mirror Development Activities*, Solar Energy Research Institute, Golden, Colorado (1979), Vossen and Kern, *Thin Film Processes*, Academic Press NY, NY (1978).

*Primary Examiner*—John Kittle
*Assistant Examiner*—P. R. Schwartz
*Attorney, Agent, or Firm*—Kenneth Richardson; John M. Albrecht; Judson R. Hightower

[57] ABSTRACT

A protective diffusion barrier for metalized mirror structures is provided by a layer or coating of silicon nitride which is a very dense, transparent, dielectric material that is impervious to water, alkali, and other impurities and corrosive substances that typically attack the metal layers of mirrors and cause degradation of the mirrors' reflectivity. The silicon nitride layer can be deposited on the substrate before metal deposition to stabilize the metal/substrate interface, and it can be deposited over the metal to encapsulate it and protect the metal from corrosion or other degradation. Mirrors coated with silicon nitride according to this invention can also be used as front surface mirrors.

4 Claims, 3 Drawing Sheets

SILICON NITRIDE PROTECTIVE COATINGS FOR SILVERED GLASS MIRRORS

CONTRACTUAL ORIGIN OF THE INVENTION

The United States Government has rights in this invention pursuant to Contract No. DE-AC02-83CH10093 between the United States Department of Energy and the Solar Energy Research Institute, a Division of the Midwest Research Institute.

This is a continuation of application Ser. No. 632,742 filed July 20, 1984 now abandoned.

BACKGROUND OF THE INVENTION

1. Field of the Invention

The present invention relates to mirrors, and more particularly, to a protective coating for the silver layer of a silvered glass mirror to protect the silver layer from degradation.

2. Description of the Prior Art

Most commercial mirrors are silvered glass composite structures wherein a thin layer of silver is deposited on the surface of a glass substrate to reflect light. Silver is used because its reflectively is significantly greater than other metals. A common commercial process for fabricating such mirrors is known as a wet chemical electroless process, wherein a thin layer of chemically reduced silver is precipitated onto a sensitized glass surface. In order to protect the silver layer from damage and degradation, a protective coating is applied to its exposed surface. A common protective coat is comprised of a copper layer deposited over the silver layer with a thick enamel paint spread over the copper layer. The copper layer interposed between the silver and paint layers enhances adhesion of the paint to the silver. A typical composite silvered glass mirror structure is shown in FIG. 1.

Silvered glass mirrors structured as described above have been used indoors without significant problems for many years. The more recent interest in use of mirrors for solar collector applications, such as heliostats, has resulted in more test installations of mirrors outdoors. While such tests have indicated economic feasibility of mirrored solar collector concepts from an energy standpoint, they unfortunately also revealed that conventional silvered glass mirrors do not stand up very well in outdoor environments. In fact, the reflective properties of most conventional mirrors undergo substantial degradation within several months to several years in outdoor environments, which is a relatively short time when a useful life of 20 years is generally considered to be minimum design requirements for economical solar collector installations.

The exact optical and mechanical degradation mechanisms of this physiochemical corrosion process are not well understood. Environmental and electrochemical test have shown that the corrosion reaction that occurs at the glass/metal interface of a mirrored surface is extremely sensitive to interfacial environment. It is believed that collection of humidity and chemicals normally found in the atmosphere in imperfections and crevices of the plated metal surface, fabrication chemicals, glass leaching, local hot spots and stresses, and photoactivation of the surface metals produces deleterious effects and causes large variances in the durability of mirrored surfaces.

Detailed surface analyses of mirrors degraded in outdoor environments have indicated several possible mechanisms for chemicaly induced changes at critical interfaces, such as at the silver/glass interface. Both iron and alkali metal ions have been found to concentrate at the silver/glass interface and are suspected of reducing the silver to glass bond strength and contributing to silver degradation when water diffuses from exposed edges or from coating flaws into the silver/glass interface. This interface is also weakened by the tendency of the glass to form a hydroxide gel layer on its surface. Such gel formation is promoted by the reduction of tin complexes (sensitizers) applied on the glass surface during the wet chemical electroless process of mirror fabrication, by water adsorbed on the glass surface from the air and by other interfacial impurities which result from subsequent mirroring steps in the fabrication process, including copper plating and enameling or painting.

In order to fabricate a better mirror structure that is capable of withstanding outdoor use for prolonged periods of time, such as 20 years or more, without degrading its reflective properties, it is necessary to protect the critical interfaces in the mirror from such destructive chemical reactions. Prior to this invention, such protection for mirrors was unknown.

SUMMARY OF THE INVENTION

Accordingly, it is an object of the present invention to provide a novel protective barrier around the laminated layers of a mirror structure to repel any outside humid, contaminating, or corrosive environment.

It is also an object of the present invention to stabilize the silver/glass interface in a mirror structure to protect the integrity of the silver from deleterious chemical degradation.

To achieve the foregoing and other objects and in accordance with the purpose of the present invention, as embodied and broadly described herein, the mirror structure of this invention may comprise a layer of silver deposited on a glass substrate to form a reflective surface and a layer of silicon nitride deposited on the silver to form a diffusion barrier that is impervious to water and corrosive substances in the atmosphere. A layer of silicon nitride can also be provided at the interface between the substrate and the silver to provide a diffusion barrier against moisture, alkalis and other impurities in the substrate from reaching the silver.

This invention also includes the method of fabricating mirrors by depositing silicon nitride diffusion barriers both over and under the silver on a substrate. Since silicon nitride is transparent and forms such a dense, effective diffusion barrier over the silver, mirrors fabricated by this process can be used as front reflective mirrors.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

BRIEF DESCRIPTION OF THE DRAWINGS

The accompanying drawings, which are incorporated in and form a part of the specifications illustrate preferred embodiments of the present invention, and together with the description, serve to explain the principles of the invention. In the drawings.

DETAILED DESCRIPTION OF THE PREFERRED EMBODIMENTS

Figure 1:
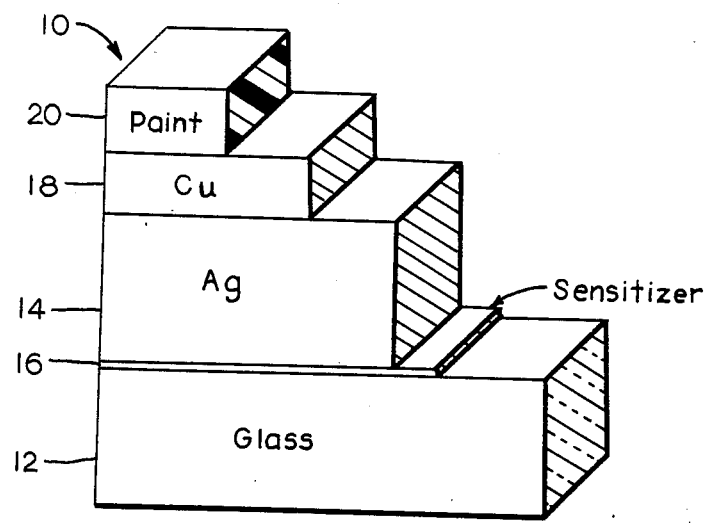
FIG. 1 is a perspective diagrammatic block view of the structure of a conventional silver glass mirror constructed according to a common wet chemical electroless process.

A typical mirror structure 10 constructed according to the conventional wet chemical electroless process is illustrated in FIG. 1. It is a composite structure comprised of a glass substrate 12 with a layer of silver (Ag) 14 coated on the glass substrate surface. A sensitizer 16, usually consisting of a tin chloride, water, and hydrochloric acid solution is deposited on the surface of the glass substrate 12 prior to the silver to enhance adhesion of the silver layer 14 to the glass substrate 12. A paint layer 20 is coated over the mirror in an attempt to protect the mirror from the environment. However, paint layer 20 does not adhere very well to the silver layer 14. Therefore, a thin copper (Cu) layer 18 is first deposited on the silver layer 14, and the paint layer 20 is coated over the copper layer 18. The copper layer 18 also shields the silver layer 14 to some extend from the deleterious chemical degradation of the silver that could otherwise result from the ingredients and impurities in the paint layer 20.

The substantial degradation of silver/glass mirror structures 10 in outdoor environments, as discussed above, shows that the paint 20 and copper 18 layers do not provide sufficient protection.

The method of producing silver/glass mirrors according to this invention provides a much superior protective coating for both the silver layer and the silver/glass interface, where degradation of such mirrors normally occurs. This protective coating is preferably a silicon nitride material which is a very dense, impermeable, refractory, material that is a good dielectric and is thermally shock resistant. Silicon nitride also advantageously forms a strong, coherent and chemically stable coating on the glass. In fact, silicon nitride is one of the few dielectric, transparent materials available that has a structure dense enough, not only to prevent permeation by water vapor, but also to act as a diffusion barrier to many ions, including the alkalis, which attack the silver and the silver-to-glass bond.

A silver nitride coating is advantageous on mirrors when applied in three ways. First, such a coating can be applied over the silver layer to encapsulate and hermetically seal the silver layer with the glass substrate. Second, the coating can be applied to the glass substrate surface prior to applicaton of the silver. Third, a combination of encapsulation and surface sealing with the silicon nitride coating combines the protective benefits of both the first and second methods.

Figure 2:
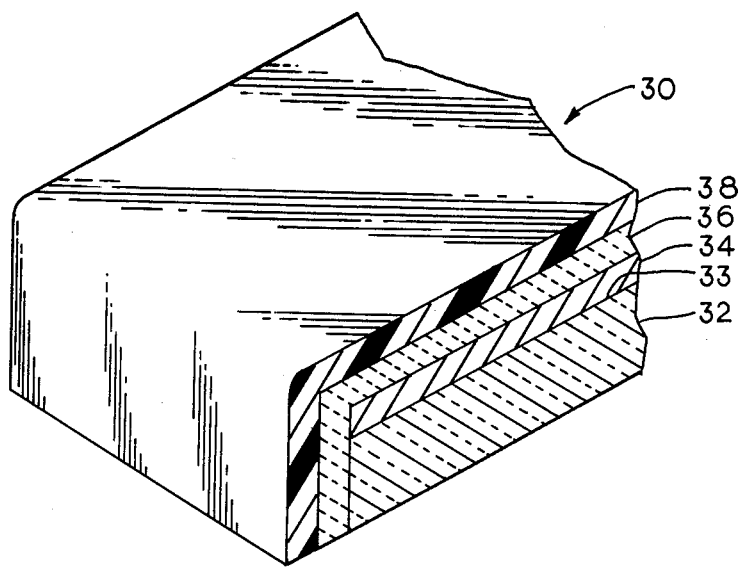
FIG. 2 is an enlarged cross-sectional view in perspective showing a mirror constructed with a protective barrier according to this invention as a surface coating.

The mirror structure 30 illustrated in FIG. 2 is an example of the use of the silver nitride coating to cover and encapsulate the silver layer 34 with the glass substrate 32. As shown therein, the glass substrate 32 has deposited thereon a layer of silver 34 by the conventional wet chemical electroless process. Of course, a sensitizer (not shown) is applied to the silver/glass interface 33 in this process, as described above and shown in FIG. 1. The silicon nitride protective coating 36 is then deposited, as shown in FIG. 2, over the silver layer 34 and around the edges to hermetically seal the silver layer 34 and silver/glass interface 33 from the exterior environment. A paint coat 38 can then be spread over the silver nitride layer 36, if desired. Of course, vacuum evaporation, sputtering, ion electroplating, and other metallic plating techniques can be used as well.

The silicon nitride layer 36 in this structure provides a protective barrier to permeation of water vapor and other impurities from and through the paint coast 38 to the silver layer 34 and into the silver/glass interface 33. Thus, degradation due to attack by these external substances is effectively inhibited.

Figure 3:
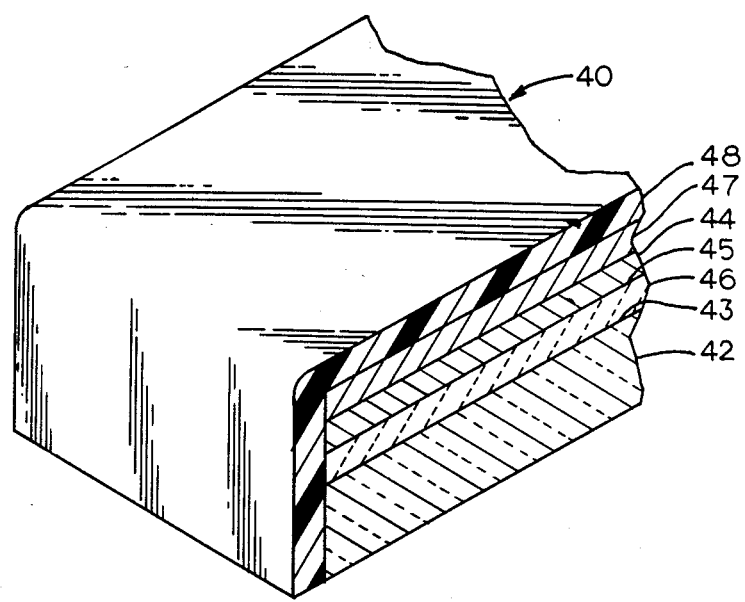
FIG. 3 is an enlarged cross-sectional view in perspective showing a mirror constructed with a protective barrier according to this invention at the silver/glass interface.

The second embodiment of this invention is shown in FIG. 3, wherein the silicon nitride layer 46 is deposited directly on the glass substrate 42. The silver layer 44 is then deposited on the silicon nitride 46. The conventional copper 47 and paint 48 coatings are provided on the exposed surface of the silver layer 44.

This second embodiment does not provide as much protection from water vapor and impurities from and through the paint coat 48 as the first embodiment. However, a significant cause of degradation of conventional silver/glass mirrors is also due to migration or leaching of alkali and water vapor through the glass to the silver/glass interface where corrosion and other deleterious chemical changes occur that can destroy the integrity of the silver and degrade the reflective properties of the silver. Therefore, the silicon nitride layer 46 deposited on the glass substrate 42, as shown in FIG. 3, serves the dual purpose of preventing alkali migration from the glass 42 to the silver/silicon nitride interface 45 and acting as an hermetic seal to any outside water vapor, thus basically stabilizing the glass surface prior to silver metalization.

Figure 4:
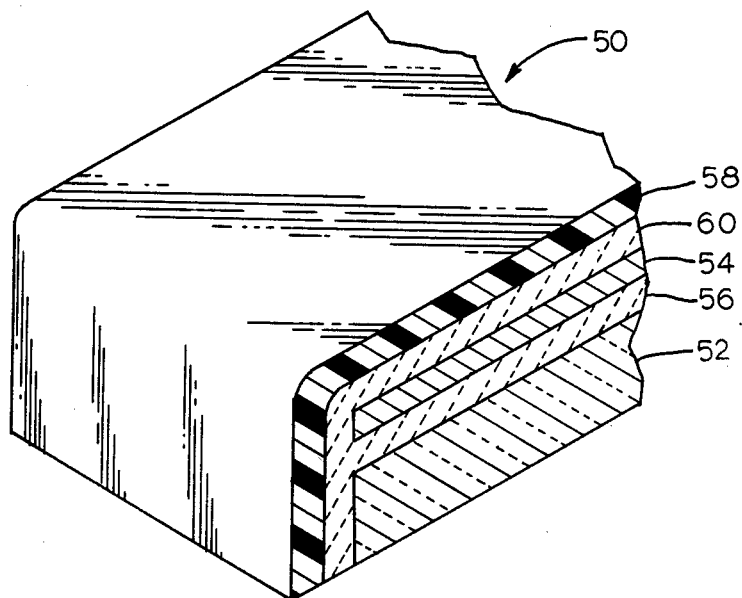
FIG. 4 is an enlarged cross-sectional view in perspective showing a mirror constructed with protective coatings according to this invention as both a silver/glass interface stabilizer and a surface coating with the silver layer sandwiched therebetween.

The third embodiment 50, shown in FIG. 4, combines the benefits of both the first embodiments 30 and second 40 embodiment described above and shown in FIGS. 2 and 3. In this third embodiment 50, silicon nitride layers 56, 60 are deposited both over the glass substrate 52 and over the silver layer 54. Therefore, as shown in FIG. 4, the silicon nitride layers 56, 60 completely surround and enclose the silver layer 54 in an hermetic seal. In this manner, the silver layer 54 is protected from diffusion of humidity and corrosive exterior environments as well as form leaching alkali and other impurities in the glass 52. A paint coating 58 can be provided over the composite structure, if desired.

Figure 5:
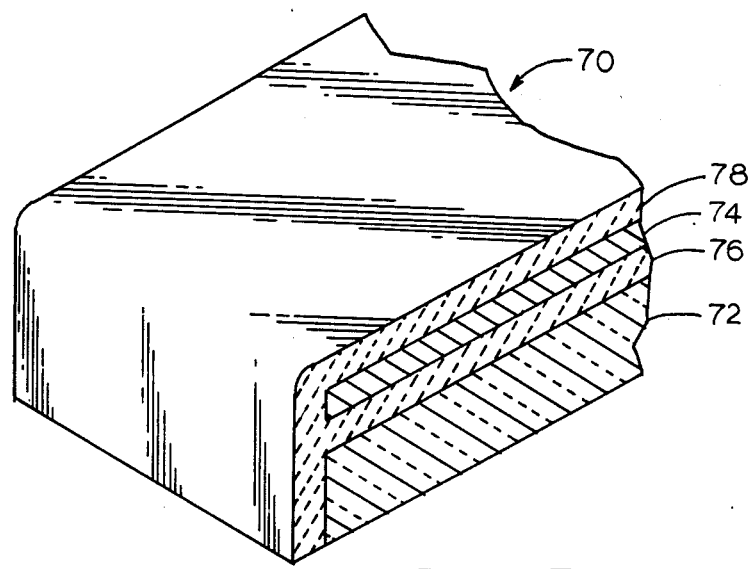
FIG. 5 is an enlarged cross-sectional view in perspective showing a mirror constructed with protective nitride coatings and used as a front face mirror.

It is also significant that the silicon nitride coatings provide sufficient protection so that the paint coating can be eliminated. Therefore, as shown in FIG. 5, this structure can be used as a front surface mirror 70, which provides improved reflection and other optical properties not inhibited by transmission of the light through the glass substrate 72. A silicon nitride coating 76 is deposited on the glass substrate 72. The silver layer 74 is deposited onto the silicon nitride layer 76, and an enclosing layer of silicon nitride 78 is then deposited over the silver layer and over the interfaces of these several layers. Since the silicon nitride layers 76, 78 are transparent, either side of the silver layer 74 can be used as the reflective surface of the mirror 70.

Figure 6:
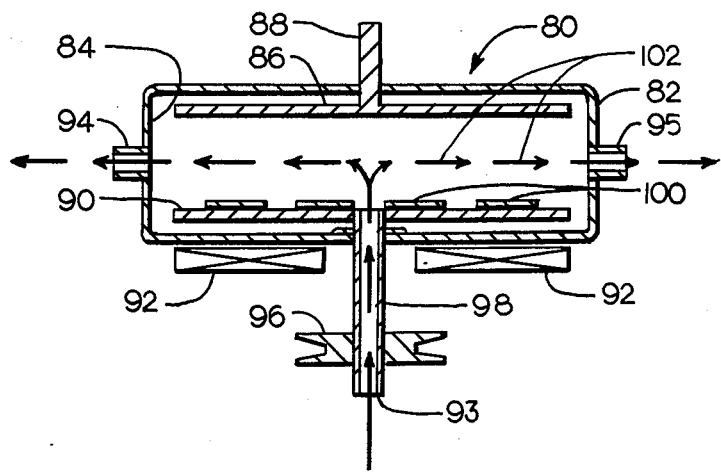
FIG. 6 is a diagrammatic cross-sectional view illustrating a parallel-plate plasma reactor used to deposit the protective coating according to this invention.

Silicon nitride is a product of the chemical reaction of silane, ammonia, and nitrogen induced by high temperature. A recently developed technique (not a part of this invention) utilizing a parallel-plate, RF-powered plasma reactor, such as that illustrated in FIG. 6, is capable of producing a silicon nitride deposit from the chemical reaction of silane, ammonia, and nitrogen at temperatures in the range of 300° C. This technique is appropriate for depositing silicon nitride coatings on glass substrates used in mirror construction.

For puspose of illustration but not for limitation, the silicon nitride deposition process in the parallel-plate plasma reactor 80 in FIG. 6 will be described. Other processes, such as sputtering, evaporation, ion plating, and the like could also be used. In this example, the reactor 80 has a housing 82 that encloses a chamber 84. A rotatable susceptor 90 is positioned in the chamber 84 and supported by a hollow rotating shaft 98. An electrode 86 is positioned in the chamber over and parallel to the susceptor 90, with an RF shielded power input 88 extending through the housing 82. Heaters 92 are positioned under the susceptor 90 for heating the chamber 84 to approximately 300° C.

A vacuum can be pulled on the chamber 84 through outlet ports 94, 95. The mixture of silane, ammonia, and nitrogen gas is introduced into the chamber 84 through an inlet 93 in the hollow shaft 98. A rotation drive 96 imparts rotary motion to the susceptor 90, on which the substrates 100 to be coated are positioned.

In operation, the substrates 100 are positioned on the susceptor 90. A vacuum is pulled on the chamber 84, while the chamber 84 is heated to about 300° C. The mixture of silane, ammonia, and nitrogen gases is flowed through the chamber 84 over the substrates 100, as indicated by the flow arrows 102. An RF field is created between the electrode 86 and susceptor 90. The combination of the vacuum, heat, and electric charge in the chamber 84 creates a chemically reactive plasma of the gases, which results in deposition of a solid coating of silicon nitride on the substrates.

After the silicon nitride coating is deposited on the glass substrate, the silver can be deposited on the substrate in a conventional process, such as wet chemical electroless deposition, vacuum evaporation, sputtering, or the like. Then the encapsulating coating of silver nitride can be deposited as described above over the silver to hermetically seal the mirror assembly.

Tests have indicated that reflectance of mirrors coated with silicon nitride is substantially the same as uncoated mirrors. Further, degradation of the silicon nitride coated mirrors in outdoor environments is greatly reduced from uncoated mirrors.

The foregoing is considered as illustrative only of the principles of the invention. For example, while this description and the explanation herein refer to silver mirrors on glass substrates, it should be understood that the structure and processes of this invention relating to silicon nitride diffusion barriers for mirrors is equally applicable to other metalized reflective surfaces, such as aluminum, copper, and the like. It is also applicable to any substrate material such as ceramics, metals, plastics or other materials that can withstand the temperature required for the silver nitride deposition. Present technology, as described above, requires approximately 300° C. temperatures, but future developments could result in lower temperature silicon nitride deposition processes. Further, the use of wet chemical electroless silver deposition processes in the description of this invention is for convenience only, since most commercial mirrors are fabricated by that or similar processes. This invention is equally applicable to metalized mirrors for which the reflective metal surfaces are deposited on the substrates by other processes, such as vacuum evaporation, sputtering, electroplating, or the like.

Further, since numerous modifications and changes will readily occur to those skilled in the art, it is not desired to limit the invention to the exact construction and operation shown and described, and accordingly all suitable modifications and equivalents are considered to fall within the scope of the invention as defined by the claims which follow.

The embodiments of the invention in which an exclusive property or privilege is claimed are defined as follows:

1. A mirror, comprising:
   a substrate comprising glass;
   a first diffusion barrier comprising silicon nitride deposited on said substrate; and
   a reflective layer of metal deposited on said first silicon nitride diffusion barrier such that said first silicon nitride diffusion barrier is positioned between the substrate and the metal for preventing leaching and diffusion of substances from and through the substrate to the metal and for avoiding metal contact and chemical reaction with the substrate.

2. The mirror of claim 1, including a second diffusion barrier comprising silicon nitride deposited on the side of said reflective metal layer that is opposite said first silicon nitride diffusion layer for sandwiching said metal layer between silicon nitride diffusion barriers while keeping said first silicon nitride diffusion barrier between the substrate and the metal.

3. The mirror of claim 2, wherein said metal layer comprises silver.

4. The mirror of claim 3, wherein said first silicon nitride diffusion barrier is in contact with the entire surface of the silver that faces said substrate and said second silicon nitride diffusion barrier covers the entire surface of the silver that faces opposite the substrate as well as covering the entire peripheral edge of the silver layer such that the entire silver layer is hermetically sealed in silicon nitride and not exposed directly to either the substrate or the atmosphere.

* * * * *